(12) United States Patent
Dodworth

(10) Patent No.: US 10,967,583 B2
(45) Date of Patent: Apr. 6, 2021

(54) APPARATUS FOR CONTROLLABLY CUTTING FIBERS AND RELATED METHODS

(71) Applicant: BRIGHT LITE STRUCTURES LLC, San Francisco, CA (US)

(72) Inventor: Antony Dodworth, Stamford (GB)

(73) Assignee: BRIGHT LITE STRUCTURES LLC, San Francisco, CA (US)

( * ) Notice: Subject to any disclaimer, the term of this patent is extended or adjusted under 35 U.S.C. 154(b) by 63 days.

(21) Appl. No.: 15/560,831

(22) PCT Filed: Mar. 31, 2016

(86) PCT No.: PCT/US2016/025270
§ 371 (c)(1),
(2) Date: Sep. 22, 2017

(87) PCT Pub. No.: WO2016/161118
PCT Pub. Date: Oct. 6, 2016

(65) Prior Publication Data
US 2018/0111339 A1    Apr. 26, 2018

Related U.S. Application Data

(60) Provisional application No. 62/142,722, filed on Apr. 3, 2015.

(51) Int. Cl.
*B29C 70/30* (2006.01)
*B29C 70/14* (2006.01)
(Continued)

(52) U.S. Cl.
CPC ............ *B29C 70/305* (2013.01); *B29C 70/06* (2013.01); *B29C 70/14* (2013.01); *B29C 70/38* (2013.01);
(Continued)

(58) Field of Classification Search
CPC ........ B29C 70/06; B29C 70/14; B29C 70/305; B29C 70/545; C03B 37/16; D01G 1/04; Y10S 83/913; Y10T 83/6648
See application file for complete search history.

(56) References Cited

U.S. PATENT DOCUMENTS

| 2,882,673 A | 4/1959 | Heinrich |
| 3,051,992 A | 9/1962 | Bradley |

(Continued)

FOREIGN PATENT DOCUMENTS

| CN | 201566184 U | 9/2010 |
| CN | 101946051 A | 1/2011 |

(Continued)

OTHER PUBLICATIONS

Non-Final Office Action for U.S. Appl. No. 15/311,606 dated May 9, 2019.
(Continued)

*Primary Examiner* — Stephen Choi
(74) *Attorney, Agent, or Firm* — Dorsey & Whitney LLP

(57) ABSTRACT

The present disclosure provides an apparatus that includes a fiber gun. In an embodiment, the apparatus may controllably cut one or more fibers into one or more fiber segments. In an embodiment, the apparatus may controllably shape one or more fibers into different shapes (e.g., from loops into substantially straight fibers). In an embodiment, the apparatus may controllably position the one or more fiber segments onto a supporting member (e.g., a composite component). For example, the apparatus may include a robot that may controllably move the fiber gun relative to a supporting member and align the fiber gun such that the one or more fiber segments are controllably positioned on the supporting member. The apparatus may further include a controller that at least partially controls operation of the apparatus.

11 Claims, 9 Drawing Sheets

(51) Int. Cl.
  *B29C 70/54* (2006.01)
  *B29C 70/38* (2006.01)
  *C03B 37/16* (2006.01)
  *D01G 1/04* (2006.01)
  *B29C 70/06* (2006.01)

(52) U.S. Cl.
  CPC ............ *B29C 70/54* (2013.01); *B29C 70/545* (2013.01); *C03B 37/16* (2013.01); *D01G 1/04* (2013.01)

(56) References Cited

U.S. PATENT DOCUMENTS

| | | |
|---|---|---|
| 3,303,733 A | 2/1967 | Sheffield et al. |
| 3,314,582 A * | 4/1967 | Haigler .................. H01L 24/78 228/1.1 |
| 3,484,398 A | 12/1969 | Childs |
| 3,906,137 A | 9/1975 | Bauer |
| 4,543,289 A | 9/1985 | Park |
| 4,687,691 A | 8/1987 | Kay et al. |
| 4,940,563 A | 7/1990 | Kromrey |
| 4,983,247 A | 1/1991 | Kim |
| 5,034,256 A | 7/1991 | Santiso, III et al. |
| 5,484,500 A | 1/1996 | Kaufmann et al. |
| 5,540,870 A | 7/1996 | Quigley |
| 5,645,926 A | 7/1997 | Horrocks et al. |
| 5,683,782 A | 11/1997 | Duchene et al. |
| 5,716,697 A | 2/1998 | Meeker |
| 5,756,182 A | 5/1998 | Landi et al. |
| 5,819,514 A | 10/1998 | Firdaus |
| 5,979,531 A | 11/1999 | Barr et al. |
| 6,038,949 A | 3/2000 | Jander |
| 6,139,942 A | 10/2000 | Hartness et al. |
| 6,197,146 B1 | 3/2001 | Sucic et al. |
| 6,251,185 B1 | 6/2001 | Morrison et al. |
| 8,028,736 B2 | 10/2011 | Jander |
| 8,334,055 B2 | 12/2012 | Le Gall et al. |
| 8,556,358 B2 | 10/2013 | Fitzgerald et al. |
| RE44,893 E | 5/2014 | Raghavendran et al. |
| 8,777,136 B2 | 7/2014 | Jander |
| 2002/0010973 A1 | 1/2002 | Dumlao et al. |
| 2002/0045696 A1 | 4/2002 | Sullivan et al. |
| 2002/0106503 A1 | 8/2002 | Monk et al. |
| 2002/0176979 A1 | 11/2002 | Evans |
| 2003/0098520 A1 | 5/2003 | Rogg et al. |
| 2003/0130411 A1 | 7/2003 | Ishikawa et al. |
| 2003/0175455 A1 | 7/2003 | Erb et al. |
| 2004/0028877 A1 | 2/2004 | Itoh et al. |
| 2006/0048311 A1 | 3/2006 | Lee |
| 2006/0065152 A1 | 3/2006 | Heitmeyer et al. |
| 2006/0251902 A1 | 11/2006 | Botrie et al. |
| 2007/0125042 A1 | 6/2007 | Hughes et al. |
| 2007/0256379 A1 | 11/2007 | Edwards |
| 2008/0223857 A1 | 9/2008 | Palley et al. |
| 2009/0227162 A1 | 9/2009 | Kruckenberg et al. |
| 2010/0021718 A1 | 1/2010 | Vos et al. |
| 2010/0255283 A1 | 10/2010 | Monk et al. |
| 2010/0261000 A1 | 10/2010 | Jones |
| 2011/0089183 A1 | 4/2011 | Gundelsheimer |
| 2011/0143087 A1 | 6/2011 | Alberding et al. |
| 2011/0180959 A1 | 7/2011 | Donnelly et al. |
| 2011/0272509 A1 | 11/2011 | Jander |
| 2012/0098300 A1 | 4/2012 | Murray |
| 2012/0141765 A1 | 6/2012 | Katahira et al. |
| 2012/0177874 A1 | 7/2012 | Brandon et al. |
| 2012/0204741 A1 | 8/2012 | Bremmer et al. |
| 2013/0101822 A1 | 4/2013 | Kunal et al. |
| 2013/0171381 A1 | 7/2013 | Grove-Nielsen |
| 2013/0203878 A1 | 8/2013 | Igualada et al. |
| 2013/0224410 A1 | 8/2013 | Nozawa |
| 2013/0273308 A1 | 10/2013 | Day et al. |
| 2013/0284003 A1 | 10/2013 | Dodworth |
| 2013/0292076 A1 | 11/2013 | Raghavendran et al. |
| 2013/0323429 A1 | 12/2013 | Strobel et al. |
| 2014/0011016 A1 | 1/2014 | Vanimisetti et al. |
| 2014/0145470 A1 | 5/2014 | Preisler et al. |
| 2015/0166743 A1 | 6/2015 | Restuccia et al. |
| 2017/0057823 A1 | 3/2017 | Hart et al. |
| 2017/0095997 A1 | 4/2017 | Dodworth |
| 2017/0218141 A1 | 8/2017 | Nosker et al. |
| 2017/0283571 A1 | 10/2017 | Taketa et al. |

FOREIGN PATENT DOCUMENTS

| | | |
|---|---|---|
| CN | 201755923 U | 3/2011 |
| CN | 102227521 A | 10/2011 |
| CN | 102271888 A | 12/2011 |
| CN | 102548741 A | 7/2012 |
| CN | 203077713 U | 7/2013 |
| CN | 104254439 A | 12/2014 |
| DE | 102013225730 A1 | 6/2015 |
| EP | 0352993 A1 | 1/1990 |
| EP | 0478033 A1 | 4/1992 |
| EP | 0605235 A2 | 7/1994 |
| EP | 0628406 A2 | 12/1994 |
| EP | 0794051 A1 | 9/1997 |
| EP | 0798107 A2 | 10/1997 |
| EP | 1789250 B1 | 5/2016 |
| FR | 2890893 A1 | 3/2007 |
| GB | 2101930 A | 1/1983 |
| GB | 2300380 A | 11/1996 |
| JP | Y1965027900 | 9/1965 |
| JP | 51041764 A | 4/1976 |
| JP | S5334866 Y2 | 8/1978 |
| JP | S55-049251 A | 4/1980 |
| JP | S57113695 U | 7/1982 |
| JP | 01320145 A | 12/1989 |
| JP | 02088227 A | 3/1990 |
| JP | H03-099812 A | 4/1991 |
| JP | H03109145 A | 5/1991 |
| JP | H05132540 A | 5/1993 |
| JP | H06270304 A | 9/1994 |
| JP | 06344477 A | 12/1994 |
| JP | 07047626 A | 2/1995 |
| JP | 07125118 A | 2/1995 |
| JP | H0718081 U | 3/1995 |
| JP | H07180281 A | 7/1995 |
| JP | H07256803 A | 10/1995 |
| JP | 08258189 A | 10/1996 |
| JP | H08258189 A | 10/1996 |
| JP | 1125453 A | 1/1999 |
| JP | H11-25453 | 1/1999 |
| JP | 11207843 A | 8/1999 |
| JP | H11-207843 A | 8/1999 |
| JP | H11207843 A | 8/1999 |
| JP | 11247356 A | 9/1999 |
| JP | H11254563 A | 9/1999 |
| JP | 2000006145 A | 1/2000 |
| JP | 2000043171 A | 2/2000 |
| JP | 2001031838 A | 2/2001 |
| JP | 2003025360 A | 1/2003 |
| JP | 2004017355 A | 1/2004 |
| JP | 2006188688 A | 7/2006 |
| JP | 2007331369 A | 12/2007 |
| JP | 2008230235 A | 10/2008 |
| JP | 2008238566 A | 10/2008 |
| JP | 2010149260 A | 7/2010 |
| JP | 2013001006 A | 1/2013 |
| JP | 2013032510 A | 2/2013 |
| JP | 2014533751 A | 12/2014 |
| WO | 90/00968 | 2/1990 |
| WO | 92/10362 | 6/1992 |
| WO | 92/12855 A | 8/1992 |
| WO | 2003101719 A2 | 12/2003 |
| WO | 2009011304 A1 | 1/2009 |
| WO | 2009157295 A1 | 12/2009 |
| WO | 2013178755 A1 | 12/2013 |
| WO | 2014130751 A1 | 8/2014 |
| WO | 2016178755 A1 | 11/2016 |
| WO | 2017120025 A1 | 7/2017 |

(56) References Cited

OTHER PUBLICATIONS

Non-Final Office Action for U.S. Appl. No. 15/311,271 dated Nov. 19, 2018.
Notice of Allowance for U.S. Appl. No. 15/311,344 dated Jan. 15, 2019.
Notice of Allowance for U.S. Appl. No. 15/311,271 dated May 1, 2019.
Notice of Allowance for U.S. Appl. No. 15/311,606 dated Jan. 23, 2019.
Notice of Allowance for U.S. Appl. No. 15/311,703 dated Mar. 5, 2019.
Non-Final Office Action for U.S. Appl. No. 15/311,703 dated Sep. 18, 2018.
Notice of Allowance for U.S. Appl. No. 15/311,344 dated Sep. 28, 2018.
Restriction Requirement for U.S. Appl. No. 15/311,271 dated Aug. 28, 2018.
Restriction Requirement for U.S. Appl. No. 15/311,703 dated Jun. 27, 2018.
Issue Notification for U.S. Appl. No. 15/311,271 dated Aug. 21, 2019.
Issue Notification for U.S. Appl. No. 15/311,344 dated Aug. 14, 2019.
Non-Final Office Action for U.S. Appl. No. 15/311,703 dated Jun. 17, 2019.
Notice of Allowance for U.S. Appl. No. 15/311,344 dated Apr. 25, 2019.
Notice of Allowance for U.S. Appl. No. 15/311,606 dated Sep. 30, 2019.
Notice of Allowance for U.S. Appl. No. 15/311,703, dated Oct. 23, 2019.
U.S. Appl. No. 16/537,051, filed Aug. 9, 2019.
International Search Report and Written Opinion from International Application No. PCT/US2019/062138 dated Mar. 19, 2020.
International Search Report and Written Opinion from International Application No. PCT/US2019/062139 dated Mar. 19, 2020.
Notice of Allowance for U.S. Appl. No. 15/311,606 dated Jan. 29, 2020.
Notice of Allowance for U.S. Appl. No. 15/311,703 dated Feb. 5, 2020.
Corrected Notice of Allowability for U.S. Appl. No. 15/311,606 dated Aug. 17, 2020.
Corrected Notice of Allowability for U.S. Appl. No. 15/311,703 dated Aug. 19, 2020.
Notice of Allowance for U.S. Appl. No. 15/311,606 dated May 11, 2020.
Notice of Allowance for U.S. Appl. No. 15/311,703 dated May 11, 2020.
"Araldite FST 40002/40003 FST Composite System for Aerospace Interior," Huntsman Advanced Materials Flyer, 2014, pp. 1-2.
"Araldite FST 40004/40005 FST Composite System for Railway," Huntsman Advanced Materials Flyer, 2016, pp. 1-2.
"Araldite, Solutions or Automotive Mass Production," Huntsman Advanced Materials Flyer, 2014, pp. 1-2.
"Tough Sandwich Design Lightens Load Floor in Crossover SUV," Composites Technology, Jun. 1, 2008, Retrieved Nov. 22, 2016.
Bosch, Marcos Ramos, "New Sandwich Composites: For Lightweight Construction in the Automotive Industry," JEC Magazine #45, Nov.-Dec. 2008, Retrieved Nov. 22, 2016.
CompositesWorld, "High-tensile strength, high-modulus carbon fiber" Mar. 10, 2014 [online] [retrieved on Oct. 1, 2015). Retrieved from the Internet <URL: http://www.compositesworld.com/products/high-tensile-strength-high-modulus-carbon-fiber>.
International Search Report and Written Opinion from International Application No. PCT/US2015/034051 dated Nov. 3, 2015.
International Search Report and Written Opinion from International Application No. PCT/US2015/034061 dated Aug. 19, 2015.
International Search Report and Written Opinion from International Application No. PCT/US2015/034070 dated Feb. 1, 2016.
International Search Report and Written Opinion from International Application No. PCT/US2015/034072 dated Nov. 2, 2015.
Non-Final Office Action for U.S. Appl. No. 15/311,344 dated Jan. 11, 2018.
Restriction Requirement for U.S. Appl. No. 15/311,344 dated Oct. 20, 2017.
Notice of Allowance for U.S. Appl. No. 15/311,344 dated Jun. 20, 2018.
Restriction Requirement for U.S. Appl. No. 15/311,606 dated Jun. 7, 2018.
Corrected Notice of Allowability for U.S. Appl. No. 15/311,703 dated Aug. 31, 2020.
International Search Report and Written Opinion from International Application No. PCT/US2016/025270 dated Jun. 24, 2016.
Issue Notification for U.S. Appl. No. 15/311,606 dated Sep. 3, 2020.
Issue Notification for U.S. Appl. No. 15/311,703 dated Sep. 9, 2020.
Restriction Requirement for U.S. Appl. No. 16/537,051 dated Sep. 21, 2020.
U.S. Appl. No. 62/007,614, filed Jun. 4, 2014.
U.S. Appl. No. 62/007,632, filed Jun. 4, 2014.
U.S. Appl. No. 62/007,652, filed Jun. 4, 2014.
U.S. Appl. No. 62/007,670, filed Jun. 4, 2014.
U.S. Appl. No. 62/007,685, filed Jun. 4, 2014.
U.S. Appl. No. 62/108,837, filed Jan. 28, 2015.
U.S. Appl. No. 62/142,722, filed Apr. 3, 2015.

* cited by examiner

APPARATUS FOR CONTROLLABLY CUTTING FIBERS AND RELATED METHODS

CROSS-REFERENCES TO RELATED PATENT APPLICATIONS

This application claims priority to U.S. Patent Application No. 62/142,722, entitled "Apparatus for Automatically Cutting Fibers and Aligning One or More Fiber Segments," filed on Apr. 3, 2015, the disclosure of which is incorporated herein, in its entirety, by this reference.

This application is related to the following commonly owned patent applications, each of which is incorporated herein by this reference in its entirety:

U.S. Patent Application No. 62/007,685, entitled "Composite Structure Having Transition Region Stiffened with Reinforced Fibers," filed on Jun. 4, 2014.

U.S. Patent Application No. 62/007,614, entitled "Composite Sandwich with High Bending Stiffness and Light Weight," filed on Jun. 4, 2014.

U.S. Patent Application No. 62/007,632, entitled "Polymer Resin and Composite," filed on Jun. 4, 2014.

U.S. Patent Application No. 62/007,670, entitled "Composite Sandwich with High Energy Absorption and Free of Surface Defects," filed on Jun. 4, 2014.

U.S. Patent Application No. 62/007,652, entitled "Composite Laminate Free of Surface Defects," filed on Jun. 4, 2014.

U.S. Patent Application No. 62/108,837, entitled "Composite Structure with Multiple Composite Laminates," filed on Jan. 28, 2015.

BACKGROUND

Composite components (e.g., composite structures) may include one or more fibers (e.g., a single fiber, a bundle of fibers, a bundle of aligned fibers, woven fibers, etc.) coupled thereto that are configured to reinforce the composite components. The one or more fibers may be coupled to the composite components at and/or near transition regions, such as corners of the composite components or portions of the composite around a metal insert. The transition region may include a high order of form changes, such as curvatures, corners, holes, stress concentrators, or variations in thickness. Generally, the transition region may include a stresses concentrated thereabout and thus may be stiffened by coupling one or more fiber segments thereto for reinforcement.

For example, the composite components may include a corner region that may be reinforced with one or more fiber segments. The composite component may also include a metal insert surrounded by a thicker section, a thinner section adjacent to the metal insert, and a transition region that connects the thicker section to the thinner section. The metal insert may be attached to at least a portion of the thinner section.

One common method of reinforcing at least a portion of a composite component using one or more fiber segments includes using a polymer resin or an adhesive (e.g., epoxy) to align a plurality of fibers. The plurality of aligned fibers may then be placed into a mold to form the reinforced composite component. In some cases, the method may include adding an additional amount polymer resin or an adhesive to the mold. In some cases, the method may also include curing the polymer resin. This method of forming a reinforced composite component may exhibit high labor costs.

Therefore, manufacturers and users of reinforced composite components continue to seek improved reinforced composite components and manufacturing techniques.

SUMMARY

The present disclosure provides an apparatus that may controllably cut, shape, and/or position one or more fiber segments. Specifically, the apparatus may controllably cut fibers into one or more fiber segments of substantially constant lengths, controllably shape continuous fibers from loops into straight fibers, and controllably position the one or more fiber segments on a supporting member (e.g., a composite component).

In an embodiment, a fiber gun is disclosed. The fiber gun may include a mandrel having a longitudinal axis and coupleable to a source including one or more fibers. The mandrel may include an uppermost portion, a lowermost portion generally opposite the uppermost portion, and a length extending between the uppermost portion and the lowermost portion. A cross-sectional area of the mandrel may vary along at least a portion of the length of the mandrel. A cross-sectional perimeter of the mandrel remains substantially constant along substantially all of the length of the mandrel. The fiber gun may also include a transport mechanism configured to move the one or more fibers from a first portion of the mandrel at and/or near the uppermost portion to a second portion of the mandrel at and/or near the lowermost portion of the mandrel. Finally, the fiber gun may include at least one cutter including one or more cutting elements. Each of the one or more cutting elements may be disposed at least proximate to at least one cutting surface of the mandrel and configured to cut the one or more fibers. The at least one cutting surface may be at and/or near the lowermost portion of the mandrel.

In an embodiment, an apparatus is disclosed. The apparatus may include a fiber gun. The fiber gun may include a mandrel. The mandrel may include a longitudinal axis. The mandrel may include an uppermost portion, a lowermost portion generally opposite the uppermost portion, and a length extending between the uppermost portion and the lowermost portion. A cross-sectional area of the mandrel may vary along at least a portion of the length of the mandrel. A cross-sectional perimeter of the mandrel remains substantially constant along substantially all of the length of the mandrel. The mandrel may also include a transport mechanism configured to move one or more fibers from a first portion of the mandrel at and/or near the uppermost portion to a second portion of the mandrel at and/or near the lowermost portion of the mandrel. Finally, the mandrel may include at least one cutter. The at least one cutter may include one or more cutting elements. Each of the one or more cutting elements may be disposed at least proximate to at least one cutting surface of the mandrel and configured to cut the one or more fibers. The at least one cutting surface may be at and/or near the lowermost portion of the mandrel. The apparatus may also include a robot configured to controllably move the fiber gun relative to a supporting member. The apparatus may further include a controller operably coupled to the fiber gun and the robot. The controller may be configured to at least partially control operation of the fiber gun and the robot.

In an embodiment, a method of cutting one or more fibers is disclosed. The method may include providing a fiber gun.

The fiber gun may include a mandrel having a longitudinal axis. The mandrel may further include an uppermost portion and a lowermost portion spaced from the uppermost portion. The mandrel may exhibit a length extending between the uppermost portion and the lowermost portion. The mandrel may also exhibit a cross-sectional area that varies along at least a portion of the length of the mandrel. The fiber gun may also include a transport mechanism. The fiber gun may further include at least one cutting element disposed at least proximate to at least one cutting surface of the mandrel. The method may also include activating a transport mechanism to move one or more fibers from a first portion of a mandrel at and/or near the uppermost portion of the mandrel to a second portion of the mandrel at and/or near the lowermost portion of the mandrel. The method may further includes cutting the one or more fibers using the at least one cutting element at and/or near the lowermost portion of the mandrel to form one or more fiber segments. The method may further include controllably positioning each of the one or more fiber segments on a supporting member that is disposed below the fiber gun.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The description will be more fully understood with reference to the following figures, which are presented as various embodiments of the disclosure and should not be construed as a complete recitation of the scope of the disclosure, wherein.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

The present disclosure provides an apparatus that includes a fiber gun. In an embodiment, the apparatus may controllably cut one or more fibers into one or more fiber segments. In an embodiment, the apparatus may controllably shape one or more fibers into different shapes (e.g., from loops into substantially straight fibers). In an embodiment, the apparatus may controllably position the one or more one or more fiber segments onto a supporting member (e.g., a composite component). For example, the apparatus may include a robot that may controllably move the fiber gun relative to a supporting member and align the fiber gun such that the one or more fiber segments are controllably positioned on the supporting member. The apparatus may further include a controller that at least partially controls the operation of the apparatus.

The automatic cutting, shaping, and/or positioning methods disclosed herein are significantly more efficient than manually cutting, shaping, and/or positioning fibers, which may reduce labor costs associated therewith. For example, the apparatus may cut, shape, and/or position the one or more fiber segments at a speed of 3 meters of the one or more fibers per minute. Depending upon the length of the one or more fiber segments, the apparatus may cut, shape, and position 16 one or more fiber segments of constant length in one minute.

Figure 1:
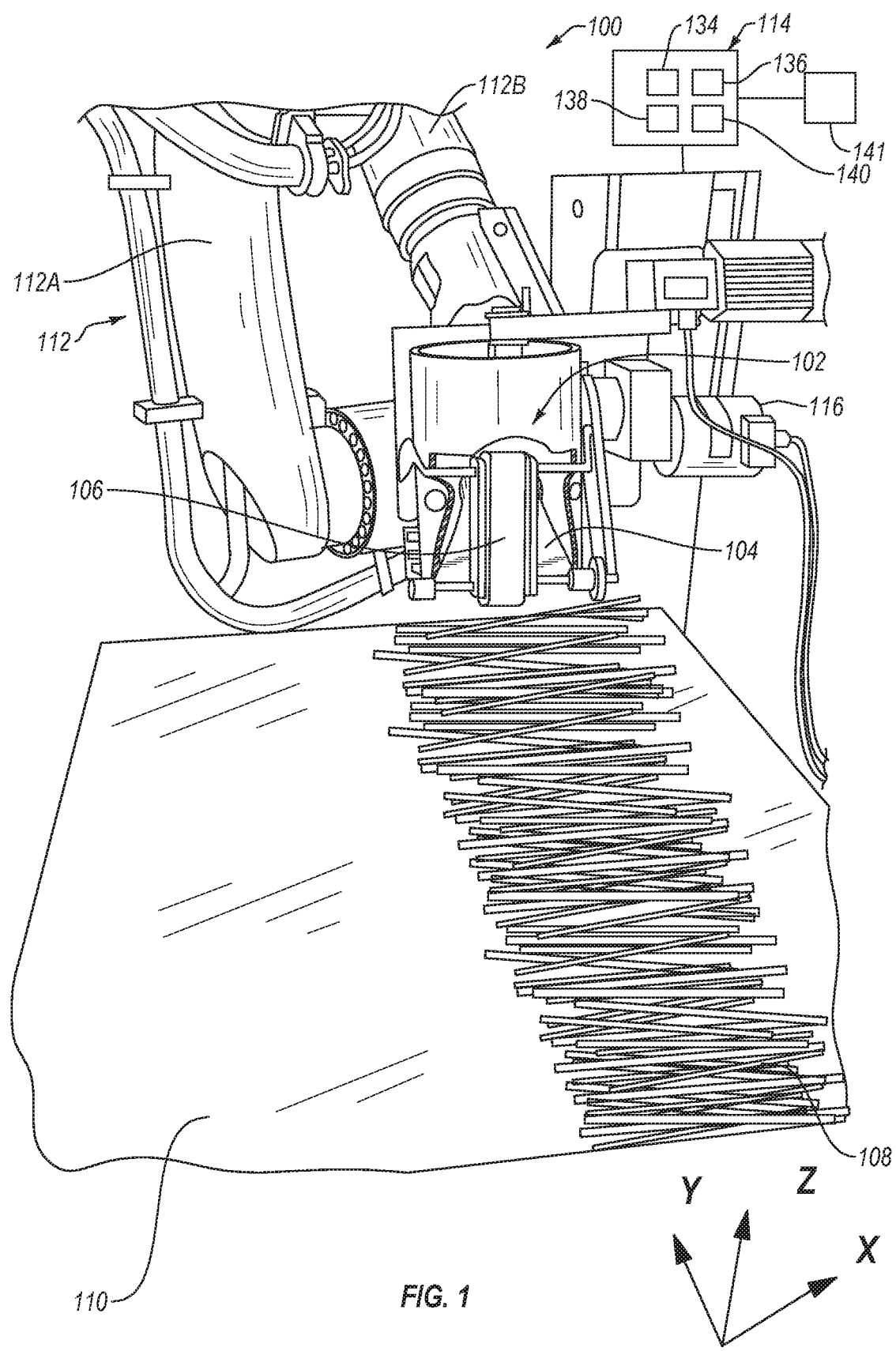
FIG. 1 is an isometric view of an apparatus that includes a fiber gun that is configured to controllably at least one of cut, shape, or position one or more fiber segments, according to an embodiment.

FIG. 1 is an isometric view of an apparatus 100 that includes a fiber gun 102 that is configured to controllably at least one of cut, shape, or position one or more fiber segments, according to an embodiment. The fiber gun 102 includes at least one mandrel 104. The mandrel 104 is configured to receive one or more fibers at and/or near an uppermost portion thereof. The fiber gun 102 includes at least one transport mechanism 106 that is configured to move the one or more fibers from a first portion of the mandrel 104 at and/or near the uppermost portion thereof to a second portion of the mandrel 104 at and/or near a lowermost portion thereof. The mandrel 104 may exhibit a cross-sectional area that varies from the first portion of the mandrel 104 at and/or near the uppermost portion thereof and the second portion of the mandrel 104 at and/or near the lowermost portion thereof. The variation in the cross-sectional shape may change the shape of the one or more fibers as the one or more fibers move from the first portion to the second portion of the mandrel 104. The fiber gun 102 also includes at least one cutter (e.g., cutter 232 of FIG. 2) disposed at least proximate to at least one cutting surface of the mandrel 104 that is at and/or near the lowermost portion of the mandrel 104. The at least one cutter may controllably cut the one or more fibers to form one or more fiber segments 108.

The fiber gun 102 may controllably position (e.g., drop, deposit, align relative to, etc.) the one or more fiber segments 108 on a supporting member 110. For example, the apparatus 100 may include a robot 112 coupled to the fiber gun 102 configured to controllably move the fiber gun 102 relative to the supporting member 110. The apparatus 100 may also include a controller 114 communicably coupled to one or more components of the apparatus 100 and configured to at least partially control the operation of the one or more components.

The apparatus 100 may include a fiber source (not shown) that includes the one or more fibers. The one or more fibers of the fiber source may include a single continuous fiber, a bundle of fibers (e.g., a bundle of aligned fibers, a bundle of woven fibers, etc.), or any other suitable fiber. For example, the one or more fibers may be a 1 k (a fiber strand including 1000 fibers), 5 k, 10 k, 12 k, 15 k, 20 k, 30 k, 40 k, 50 k, 100 k fiber strand, including ranges between any of the provided values. The one or more fibers may exhibit a total thickness of about 0.01 mm to about 5 mm, such as about 0.5 mm. The one or more fibers of the fiber source may be operably coupled to the mandrel 104.

In an embodiment, the fiber gun 102 may be configured to wrap the one or more fibers around the mandrel 104. For example, the fiber gun 102 may be configured to substantially continuously wrap the one or more fibers around the mandrel 104 such that the one or more fibers form a helical pattern as the transport mechanism 106 moves the one or more fibers along the mandrel 104. The helical pattern may exhibit a uniform spacing between each immediately adjacent lateral spaced portion of the one or more fibers. For instance, the fiber gun 102 may include a mechanism that wraps the one or more fibers around the mandrel 104.

Figure 3A:
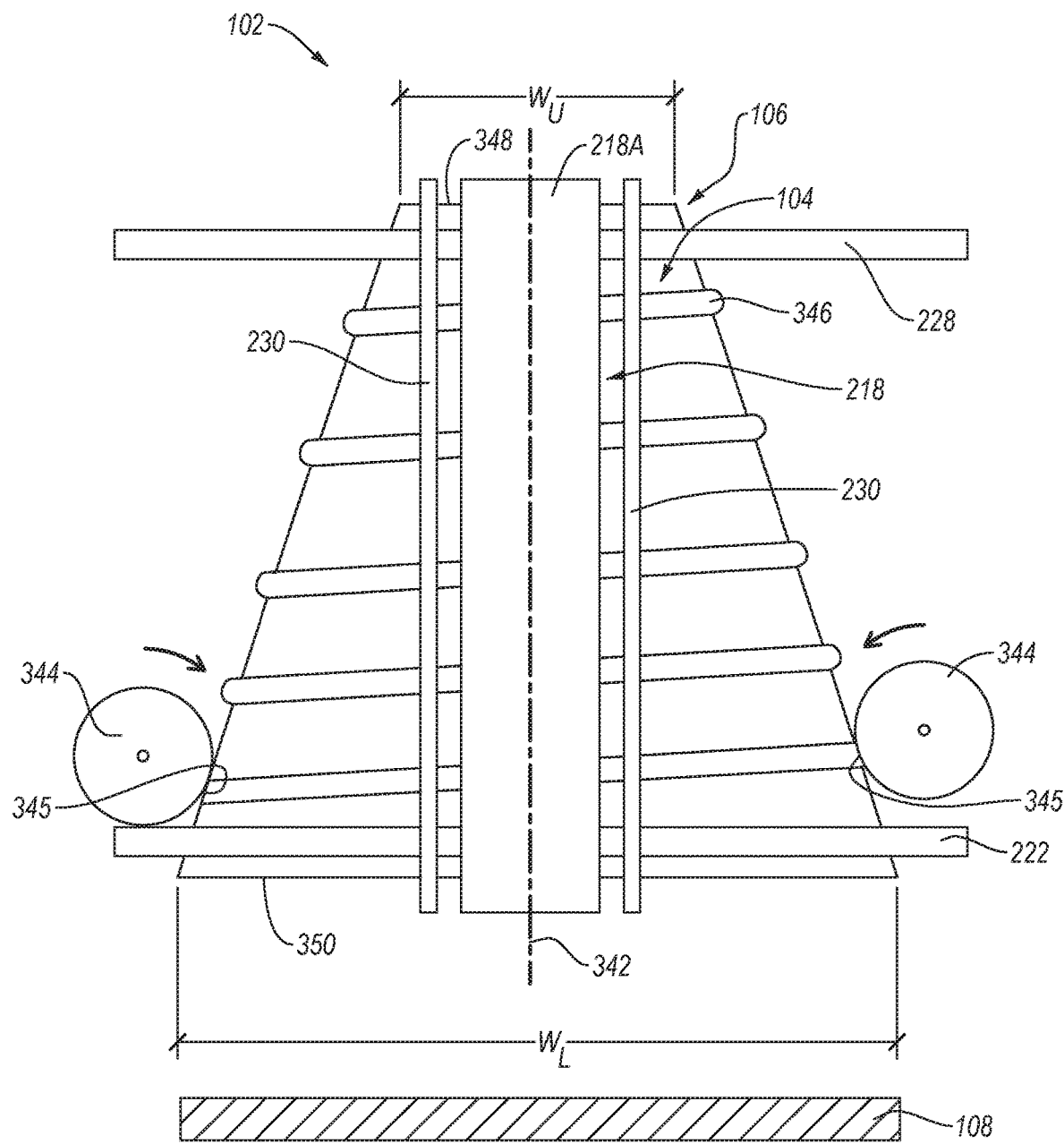
FIGS. 3A and 3B are simplified front and side elevational views, respectively, of a portion of the fiber gun shown in FIGS. 1-2, according to an embodiment.
Figure 3B:
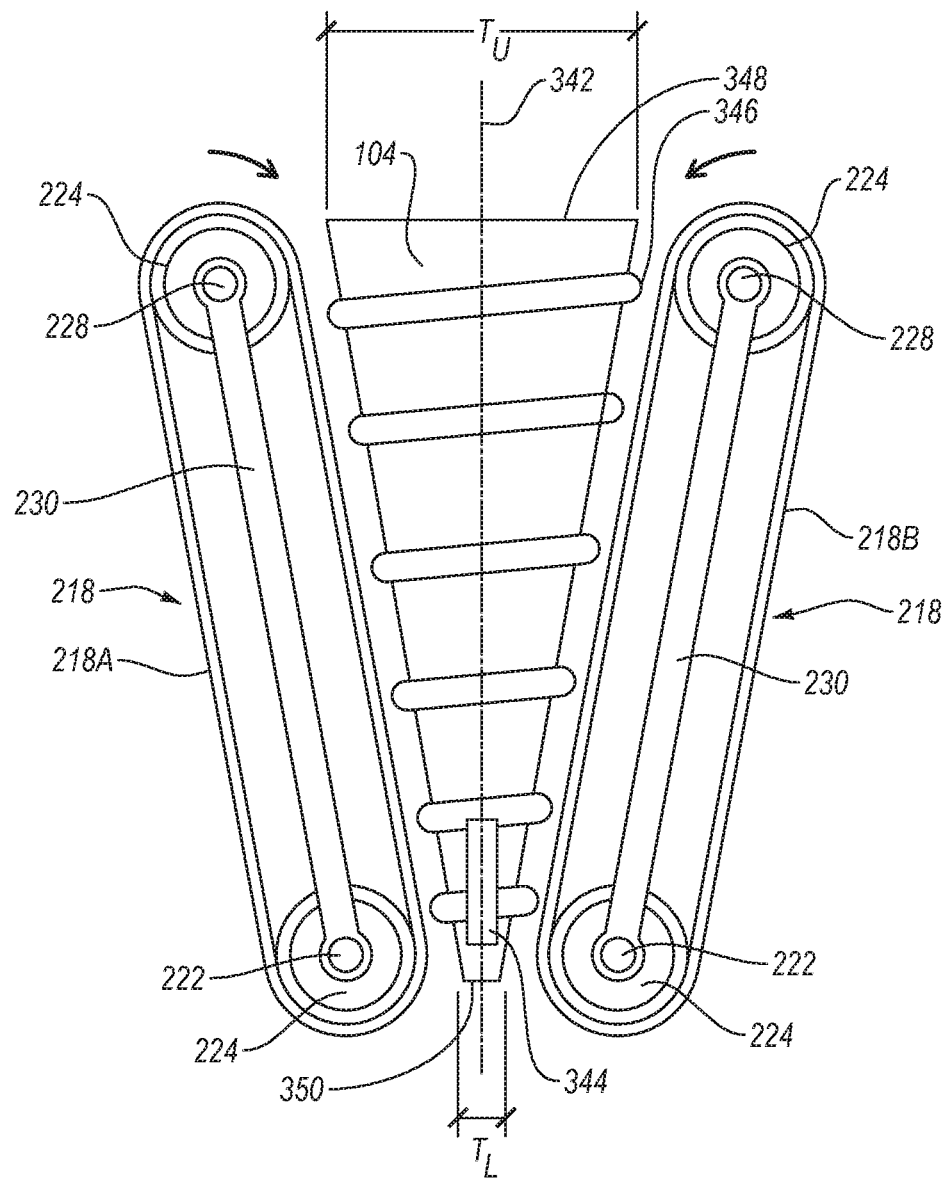

The mandrel 104 exhibits a longitudinal axis (e.g., longitudinal axis 342 of FIGS. 3A-3B). The mandrel 104 may also exhibit a length extending from uppermost portion to the lowermost portion of the mandrel 104. The length of the mandrel 104 may be measured substantially parallel to the longitudinal axis. In an embodiment, the cross-sectional area of the mandrel 104 measured substantially perpendicularly to the longitudinal axis thereof may vary along at least a portion of the length of the mandrel 104. For example, the cross-sectional area of the mandrel 104 may vary along substantially the entire length of the mandrel 104. In an embodiment, as will be discussed in more detail in relation to FIGS. 3A-4B, the cross-sectional area of the cross-sectional shape of the mandrel 104 may substantially continuously or substantially discontinuously generally decrease from the first portion of the mandrel 104 at and/or near the uppermost portion to a second portion of the mandrel 104 at and/or near the lowermost portion of the mandrel 104. However, the cross-sectional area of the mandrel 104 may vary in any suitable manner. The variation in the cross-sectional area of the mandrel 104 may change the shape of the one or more fibers as the one or more fibers move along the mandrel 104. In particular, the shape of the one or more fibers may change to at least partially conform to (e.g., at least partially retain the shape of) a surface of the mandrel 104 that the one or more fibers last contacted or contacted when the one or more fibers were cut.

A cross-sectional perimeter of the mandrel 104 remains substantially constant along substantially the entire length of the mandrel 104, such as the cross-sectional perimeter of the mandrel 104 varies by at most about 5%, at most about 4%, at most about 3%, at most about 2%, at most about 1%, or about 0% (e.g., remains constant). A cross-sectional perimeter that remains substantially constant along substantially the entire length of the mandrel 104 may facilitate the movement of the one or more fibers along the mandrel 104 by preventing the one or more fibers from breaking, becoming slack, becoming stuck on the mandrel 104, etc. In an embodiment, the cross-sectional perimeter of the mandrel 104 may remain constant along at least a portion of the length of the mandrel 104 (e.g., along substantially the entire length thereof). In an embodiment, the cross-sectional perimeter of the mandrel 104 may remain substantially constant (e.g., vary by at most about 5%) along at least a portion of the length of the mandrel 104 (e.g., along substantially the entire length thereof). For example, the cross-sectional perimeter of the mandrel 104 may remain constant from the first portion of the mandrel 104 to a portion of the mandrel 104 near the lowermost portion or a cutting surface (e.g., cutting surface 345 of FIG. 3A) of the mandrel 104. The cross-sectional perimeter of the mandrel 104 may then generally increase by at most 5% from the portion of the mandrel 104 near the lowermost portion or the cutting surface of the mandrel 104 to the lowermost portion or the cutting surface of the mandrel 104. Increasing the cross-sectional perimeter at and/or near the lowermost portion or the cutting surface of the mandrel 104 may cause the one or more fibers to be relatively tauter, which may facilitate cutting the one or more fibers. In an embodiment, the cross-sectional perimeter of the mandrel 104 may be a cross-sectional circumference when the cross-sectional shape of the mandrel 104 is generally circular.

The apparatus 100 may include a drive mechanism 116 (e.g., an electric motor, a hydraulic motor, or other suitable actuator) that may be coupled to the transport mechanism 106. For example, operation of the drive mechanism 116 may activate the transport mechanism 106 and cause the transport mechanism 106 to move the one or more fibers along at least a portion of the mandrel 104. In an embodiment, the drive mechanism 116 is disposed in and/or attached to the fiber gun 102. In an embodiment, the drive mechanism 116 is spaced from the fiber gun 102 (e.g., disposed in and/or attached to another component of the apparatus 100).

Figure 2:
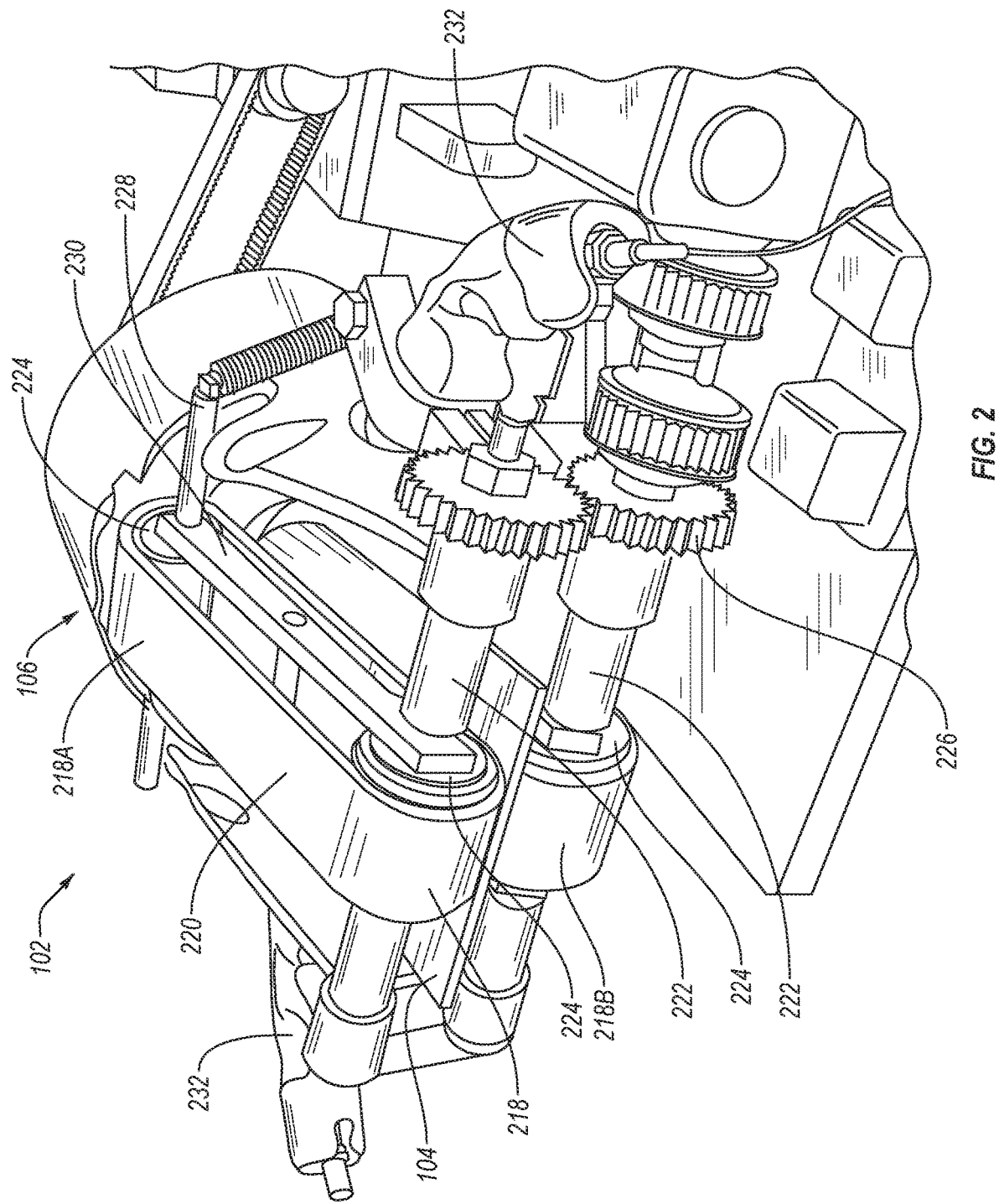
FIG. 2 is an enlarged isometric view of the fiber gun shown in FIG. 1, according to an embodiment.

The transport mechanism 106 may be any suitable mechanism configured to move the one or more fibers along at least a portion of the mandrel 104. FIG. 2 is an enlarged isometric view of the fiber gun 102 illustrated in FIG. 1, according to an embodiment. FIG. 2 illustrates one type of transport mechanism 106 that may be used in any of the embodiments disclosed herein. However, it is understood that other types of transport mechanisms may be used.

The transport mechanism 106 includes at least one belt 218 that is disposed at least proximate to (e.g., contacts) at least one surface (e.g., at least one lateral surface) of the mandrel 104. For example, the at least one belt 218 may include a first belt 218A disposed at least proximate to a first surface of the mandrel 104 and a second belt 218B disposed at least proximate to a second surface of the mandrel 104 that is generally opposite the first surface. In an embodiment, the first and second belts 218A, 218B may be substantially the same or different (e.g., exhibit different speeds, different lengths, different widths, etc.). While two belts 218 are illustrated, it is understood that the transport mechanism 106 may include a single belt or three or more belts.

The at least one belt 218 may exhibit an outer surface 220 that is configured to contact the one or more fibers and move the one or more fibers along the mandrel 104. In an embodiment, the outer surface 220 may exhibit a static or kinetic coefficient of friction against the one or more fibers that is greater than a static or kinetic coefficient of friction between the one or more fibers and the mandrel 104. For example, the outer surface 220 may exhibit a surface texture and/or material that is different than a material of the mandrel 104.

The transport mechanism 106 may include at least one shaft 222 that supports the at least one belt 218 relative to the fiber gun 102. For example, the at least one shaft 222 may be coupled to and extend from another portion of the fiber gun 102. The at least one belt 218 may be coupled to the at least one shaft 222 at an upper part thereof, a bottom part thereof, and/or another part therebetween. In an embodiment, the at least one shaft 222 may include a roller 224 coupled thereto. The roller 224 may increase the thickness of the at least one shaft 222 such that the at least one shaft 222 contacts the at least one belt 218 and maintains the at least one belt 218 generally taut.

The at least one shaft 222 may be configured to rotate the at least one belt 218 (e.g., via the roller 224). For example, the at least one shaft 222 may be coupled to one or more gears 226. The one or more gears 226 may operably couple the at least one shaft 222 to the drive mechanism 116 (FIG. 1) such that the drive mechanism 116 may rotate the at least one shaft 222. However, the at least one shaft 222 may be operably coupled to the drive mechanism 116 using other devices. For example, at least some of the one or more gears 226 may be replaced with belts or the drive mechanism 116 may be directly coupled to the at least one shaft 222.

In an embodiment, the transport mechanism 106 may include at least one passive support 228 that may be coupled to and extend from another portion of the fiber gun 102. The at least one passive support 228 may support a portion of one of the at least one belt 218 that is not supported by the at least one shaft 222 (e.g., an upper part, a bottom part, and/or a portion therebetween). The at least one passive support 228 is not configured to actively rotate the at least one belt 218. In an embodiment, the at least one passive support 228 is configured to not substantially inhibit the rotation of the at least one belt 218. In an embodiment, the passive support 228 may include a roller 224.

In an embodiment, the transport mechanism 106 may include a plurality of extension bars 230 that are connected to and extend between each of the at least one shaft 222 and, optionally, the at least one passive support 228 that support the at least one belt 218. As such, the plurality of extension bars 230 may provide additional support and/or rigidity to the at least one belt 218. In an embodiment, the plurality of extension bars 230 may be substantially perpendicular to the at least one shaft 222 and, optionally, the at least one passive support 228. In an embodiment, the plurality of extension bars 230 may be substantially parallel to a surface of the mandrel 104 that the at least one belt 218 is disposed at least proximate.

Still referring to FIG. 2, the fiber gun 102 may also include at least one cutter 232 that may cut the one or more fibers. For example, the at least one cutter 232 may include one or more cutting elements (not shown, obscured). In an embodiment, the at least one cutter 232 is disposed at least proximate to (e.g., contacts) at least one cutting surface (e.g., cutting surface 345 of FIG. 3A) of the mandrel 104. The at least one cutting surface of the mandrel 104 may be any suitable surface of the mandrel 104, for example, a side surface at and/or near a lowermost portion of the mandrel 104. The at least one cutter 232 may be configured to cut the one or more fibers as a portion of the one or more fibers moves between the at least one cutting surface of the mandrel 104 and the one or more cutting element of the at least one cutter 232.

In an embodiment, the at least one cutter 232 may be movably coupled to the fiber gun 102 such that the at least one cutter 232 is movable relative to the mandrel 104. In an example, the at least one cutter 232 may be moveable between a first position where the one or more cutting elements are spaced from the mandrel 104 and a second position where the one or more cutting elements are disposed at least proximate to the mandrel 104. In an embodiment, the at least one cutter 232 may be moveable between a first position where the one or more cutting elements are disposed at least proximate to a first cutting surface of the mandrel 104 and a second position where the one or more cutting elements are disposed at least proximate to a second cutting surface of the mandrel 104. In an embodiment, the at least one cutter 232 may be disposed at a distance from the at least one belt 218 to minimize damage to the at least one belt 218 and to not affect the portion of the one or more fibers that contact the at least one belt 218.

In an embodiment, the at least one cutter 232 may include a plurality of cutters. Each of the plurality of cutters may be disposed substantially equidistantly from each other (e.g., along a cross-sectional perimeter of the mandrel 104) such that the plurality of cutters form one or more fiber segments 108 having substantially constant and equal lengths. For example, the plurality of cutters may include two cutters that cut the one or more fibers at opposite lateral surfaces of the mandrel 104. Alternatively, at least one of the plurality of cutters may not be disposed substantially equidistantly from each other along a cross-sectional perimeter of the mandrel 104 such that the plurality of cutters form one or more fiber segments 108 having at least two different lengths.

Referring to FIG. 1, in an embodiment, the fiber gun 102 may controllably position the one or more fiber segments 108 on the supporting member 110 after the one or more fibers are cut. The supporting member 110 may be configured to at least one of support the one or more fiber segments 108, collect the one or more fiber segments 108, have the one or more fiber segments 108 attached thereto, store the one or more fiber segments 108, etc. The supporting member 110 may be, for example, a table that holds the one or more fiber segments 108, a container, a substrate, or another suitable supporting member 110. In an embodiment, the supporting member 110 may include composite component that requires additional reinforcements from the one or more fiber segments 108 in one or more regions thereof (e.g., one or more transition regions). In this embodiment, the fiber gun 102 may controllably cut and position the one or more fiber segments 108 on a surface of the composite component. In such an embodiment, the one or more fiber segments 108 may exhibit a length sufficient to reinforce the composite component.

In an embodiment, a thin layer of polymer resin or adhesive may be applied to the supporting member 110 to help attach the one or more fiber segments 108 thereto. The polymer resin or the adhesive may be applied to the supporting member 110 before, during, or after the one or more fiber segments 108 are positioned on the supporting member 110. In an embodiment, the fiber gun 102 includes a device configured to apply the polymer resin or the adhesive to the supporting member 110.

As previously discussed, the apparatus 100 may also include the robot 112 that is configured to move the fiber gun 102 relative to the supporting member 110. For example, the robot 112 may be operably coupled (e.g., directly coupled) to the fiber gun 102. In an embodiment, the robot 112 may be configured to move the fiber gun 102 in at least 1, at least 2, at least 3, at least 4, at least 5, or 6 degrees of freedom. For example, the robot 112 may be configured to move the fiber gun 102 in at least one of the x-direction, the y-direction, the z-direction, twist or rotate about the x-axis (pitch or roll), twist or rotate about the y-axis (pitch or roll), or twist or rotate about the z-axis (yaw).

In an embodiment, the robot 112 may include a stationary portion 112A and one or more active portions 112B connected to the stationary portion 112A. The one or more active portions 112B may be configured to move relative to the stationary portion 112A thereby moving the fiber gun 102 relative to the supporting member 110. As such, the one or more active portions 112B may be adjustable in its angles with respect to the stationary portion 112A or each other (e.g., include joints operably connected to the drive mechanism 116 or another suitable device), may be extendable and/or retractable (e.g., include a piston), or may be rotatable relative to each other (e.g., include a bearing). As such, the robot 112 may move the fiber gun 102 relative to the supporting member 110 such that the fiber gun 102 controllably positions the one or more fiber segments 108 on the supporting member 110.

In an embodiment, the apparatus 100 may include a robot operably coupled to the supporting member 110 (not shown) that is substantially similar to the robot 112 that is operably coupled to the fiber gun 102. As such, the robot operably coupled to the supporting member 110 may move the supporting member 110 such that the fiber gun 102 may controllably position the one or more fiber segments 108 on the supporting member 110. In an embodiment, the robot operably coupled to the supporting member 110 may operate in conjunction with the robot 112 that is operably coupled to the fiber gun 102. In an embodiment, at least one of the robot 112 that is operably coupled to the fiber gun 102 or the robot that is operably coupled to the supporting member 110 may be omitted.

As previously discussed, the controller 114 may be communicably coupled to one or more components of the apparatus 100 and at least partially control an operation of the one or more components. For example, the controller 114 may be communicably coupled to at least one of the fiber gun 102, the transport mechanism 106, the robot 112, the drive mechanism 116, the at least one cutter 232, etc. In an embodiment, the controller 114 may be communicably coupled to the drive mechanism 116 and the controller 114 may control the motor speed and/or controllably start or stop the drive mechanism 116 (e.g., by an algorithm). In an embodiment, the controller 114 may be communicably coupled to the at least one cutter 232 and the controller 114 may controllably direct when the at least one cutter 232 cuts the one or more fibers and/or when the at least one cutter 232 moves from a first position to a second position. In an embodiment, the controller 114 may also be coupled to a robot 112 and controllably and/or selectively direction the movements the robot 112.

The controller 114 may include memory 134 configured to store one or more operational instructions (e.g., one or more programs, one or more instructions for a user, etc.) therein. The memory 134 may include non-transitory memory, RAM, flash memory, a solid-state hard drive, a hard disk drive, etc. The controller 114 may also include at least one processor 136 communicably coupled to the memory 134 that is configured to execute the one or more operational instructions.

The controller 114 may also be configured to communicate with a user of the apparatus 100. For example, the controller 114 may include a display 138 that may display information about the apparatus 100 to the user. The controller 114 may also include one or more inputs 140 that enable the user to communicate with the apparatus 100. The one or more inputs 140 may include a speaker, a microphone, a mouse, a keyboard, a touchscreen, etc.

The controller 114 may also be operably connected to one or more sensors 141. The one or more sensors 141 may be attached to one or more components of the apparatus 100 and configured to detect one or more characteristics of the apparatus 100. In an embodiment, the one or more sensors 141 may include at least one optical sensor (e.g., position sensors, photoelectric sensors, etc.). The at least one optical sensor may detect the position of the fiber gun 102 relative to the supporting member 110, the position of the one or more fibers relative to the cutting element, etc. In an embodiment, the one or more sensors 141 may include at least one movement sensor (e.g., accelerometer) configured to detect movement of the fiber gun 102 or another component of the apparatus 100 that moves. In an embodiment, the one or sensors 141 may include a topography sensor configured to detect the topography of the mandrel 104 (e.g., detect the one or more fibers) or the supporting member 110 (e.g., detect the transition region or the one or more fiber segments 108). In an embodiment, the one or more sensors 141 may include any suitable sensor.

In an embodiment, the one or more sensors 141 may transmit one or more sensing signals to the controller 114 responsive to detecting the one or more characteristics of the apparatus 100. The controller 114 may at least partially control the operation of the one or more components of the apparatus 100 responsive to receiving the one or more sensing signals.

FIGS. 3A and 3B are simplified front and side elevational views, respectively, of a portion of the fiber gun 102 shown in FIGS. 1-2, according to an embodiment. As previously discussed, the mandrel 104 of the fiber gun 102 includes the longitudinal axis 342. A length of the mandrel 104 extends and is measured between the uppermost portion 348 of the mandrel 104 to the lowermost portion 350 of the mandrel 104. The fiber gun 102 also includes a transport mechanism 106. The illustrated transport mechanism 106 includes a first belt 218A disposed at least proximate to a side of the mandrel 104, a second belt 218B disposed at least proximate to an opposite side of the mandrel 104, at least one shaft 222, at least one passive support 228, a plurality of extension bars 230, and at least one roller 224. However, it is understood that one or more components of the transport mechanism 106 may be omitted or another transport mechanism may be used.

As previously discussed, the fiber gun 102 may include one or more cutting elements 344 disposed at least proximate to (e.g., contact) at least one cutting surface 345 of the mandrel 104. The at least one cutting surface 345 of the mandrel 104 may be at and/or near the lowermost portion 350 of the mandrel 104. In an embodiment, at least some of the one or more cutting elements 344 may include at least one grinding cutter. The at least one grinding cutter may rotate (as shown in FIG. 3A) to cut one or more fibers 346. The at least one grinding cutter may rotate in a direction that the one or more fibers 346 move along the mandrel 104. For example, when the at least one grinding cutter includes two grinding cutters, one of the two grinding cutters may rotate clockwise while the other grinding cutter rotates counterclockwise. The at least one grinding cutter may include a disk comprising an abrasive material. For example, the at least one grinding cutter may include a thin carbide disk, available from Flexovit. In an embodiment, at least some of the one or more cutting elements 344 may include at least one ultrasonic scissor. The at least one ultrasonic scissor may include any suitable ultrasonic scissor, including those available from C. Thompson Machines Ltd. The ultrasonic scissor uses ultrasonic energy to cut the one or more fibers. By using ultrasonic energy, the tool life may be extended compared to the grinding cutter. In another embodiment, the one or more cutting elements 344 may include any other suitable cutting element.

During operation of the fiber gun 102, the one or more fibers 346 are wrapped around the mandrel 104 at and/or near the uppermost portion 348 of the mandrel 104. The first and second belts 218A, 218B may then rotate (e.g., the at least one shaft 222 may rotate the first and second belt 218A, 218B), thereby moving the one or more fibers 346 along the mandrel 104 towards the one or more cutting elements 344. The one or more cutting elements 344 may cut the one or more fibers 346 when the first and second belts 218A, 218B move the one or more fibers 346 between the at least one cutting surface 345 of the mandrel 104 and the one or more cutting elements 344 to form one or more fiber segments 108. In an embodiment, the fiber gun 102 may drop the one or more fiber segments 108 on a supporting member immediately after cutting the one or more fibers 346. In an embodiment, the fiber gun 102 may drop the one or more fiber segments 108 on the supporting member after the first and second belt 218A, 218B move the one or more fiber segments 108 to a portion of the mandrel 104 between the at least one cutting surface 345 and the lowermost portion 350 of the mandrel 104 (e.g., after the first and second belts 218A, 218B move the one or more fiber segments 108 to the lowermost portion 350 of the mandrel 104).

As previously discussed, the cross-sectional shape of the mandrel 104 may vary along the longitudinal axis 342 thereof. For example, FIGS. 3A-3B illustrate that the mandrel 104 exhibits a width $W_U$ and thickness $T_U$ at and/or near the uppermost portion 348 thereof and a width $W_L$ and thickness $T_L$ at and/or near the lowermost portion 350 thereof. The width $W_U$ is less than the width $W_L$ and the thickness $T_U$ is greater than the thickness $T_B$. As such, the width and thickness of the mandrel 104 may generally decrease and generally increase (e.g., as measured from the uppermost portion 348 to the lowermost portion 350), respectively, along at least a portion of the length of the mandrel 104. For example, the width and thickness of the mandrel 104 may generally decrease and generally increase, respectively, along the entire length of the mandrel 104. For example, the width and thickness of the mandrel 104 may substantially continuously or substantially discontinuously generally decrease and generally increase, respectively, along at least a portion of a length of the mandrel 104. The cross-sectional perimeter of the mandrel 104 may remain substantially constant along substantially the entire length of the mandrel 104 (e.g., the entire length of the mandrel 104).

In an embodiment, the width $W_U$ and thickness $T_U$ may define a cross-sectional shape at and/or near the uppermost portion 348 of the mandrel 104 having a relatively large cross-sectional area. The cross-sectional shape at and/or near the uppermost portion 348 of the mandrel 104 may also facilitate wrapping of the one or more fibers around the mandrel 104. For example, the cross-sectional shape at and/or near the uppermost portion 350 of the mandrel 104 may be similar to the shape of the one or more fibers 346 before the shape of the one or more fibers 346 is changed using the mandrel 104. For example, the one or more fibers 346 may naturally form generally wound-up shapes (e.g., loops, curls, helix, spiral, etc.). As such, the cross-sectional shape at and/or near the uppermost portion 348 of the mandrel 104 may be generally circular, generally elliptical, or another suitable shape. The cross-sectional shape at and/or near the uppermost portion 348 of the mandrel 104 may also be generally triangular, generally rectangular, generally hexagonal, etc.

In an embodiment, the width $W_L$ and the thickness $T_L$ may define a cross-sectional shape at and/or near the lowermost portion 350 of the mandrel 104 having a relatively small cross-sectional area compared to the cross-sectional shape at and/or near the uppermost portion 348 of the mandrel 104. For example, the cross-sectional shape at and/or near the lowermost portion 350 of the mandrel 104 may exhibit a shape that is more elongated than the cross-sectional shape at and/or near the uppermost portion 348 of the mandrel 104.

The more elongated shape of the cross-sectional shape at and/or near the lowermost portion 350 of the mandrel 104 may change the shape of the one or more fibers 346. For example, the one or more fibers 346 may conform to the portion of the mandrel 104 that they are wrapped around and may at least partially retain the shape of the portion of mandrel 104 that the one or more fibers 346 last contacted or contacted when the one or more fibers 346 are cut. For example, the one or more fibers 346 may exhibit an initial shape (e.g., loops, helical, etc.). The one or more fibers 346 may then initially conform to the cross-sectional shape of the mandrel 104 at and/or near the uppermost portion 348 of the mandrel 104 when the one or more fibers 346 are wrapped around the mandrel 104. The shape of the one or more fibers 346 may then change as the one or more fibers 346 move along the mandrel 104 until the one or more fibers 346 are cut. In an embodiment, the generally elongated cross-sectional shape of the mandrel 104 at and/or near the lowermost portion of the mandrel 104 may be used to straighten portions of the one or more fibers 346. In such an embodiment, the fiber gun 102 may produce one or more fiber segments 108 that are straighter than the one or more fibers 346 before the one or more fibers 346 contacted the mandrel 104. For example, the fiber gun 102 may produce one or more fiber segments 108 that are substantially straight along substantially the entire length thereof.

While FIGS. 3A and 3B illustrate that the cross-sectional shape varies in a certain manner, it is understood that the cross-sectional shape of the mandrel 104 may vary in any suitable manner. For example, the width and thickness of the mandrel 104 may substantially continuously or substantially discontinuously generally decrease and generally increase, respectively, between the uppermost portion 348 and the lowermost portion 350 of the mandrel 104. For example, the width and/or thickness of the mandrel 104 may remain substantially unchanged along a length of the mandrel 104. For example, the cross-sectional area at and/or near the uppermost portion 348 of the mandrel 104 may be less than the cross-sectional area at and/or near the lowermost portion 350 of the mandrel 104.

In an embodiment, the cross-sectional perimeter may slightly increase from a first portion of the mandrel 104 at and/or near the uppermost portion 348 of the mandrel 104 and a second portion of the mandrel 104 at and/or near the lowermost portion 350 of the mandrel 104. For example, the cross-sectional perimeter may increase less than 10%, less than 5%, or less than 1%. The increase in the cross-sectional perimeter may cause the one or more fibers 346 to become tauter as they move along the mandrel 104. As such, increasing the cross-sectional perimeter of the mandrel 104 may improve cutting of the one or more fibers 346 and/or cause the one or more fiber segments to better retain the shape of the portion of the mandrel 104 that the one or more fibers 346 last contacted and/or contacted when the one or more fibers 346 where cut.

Figure 4A:
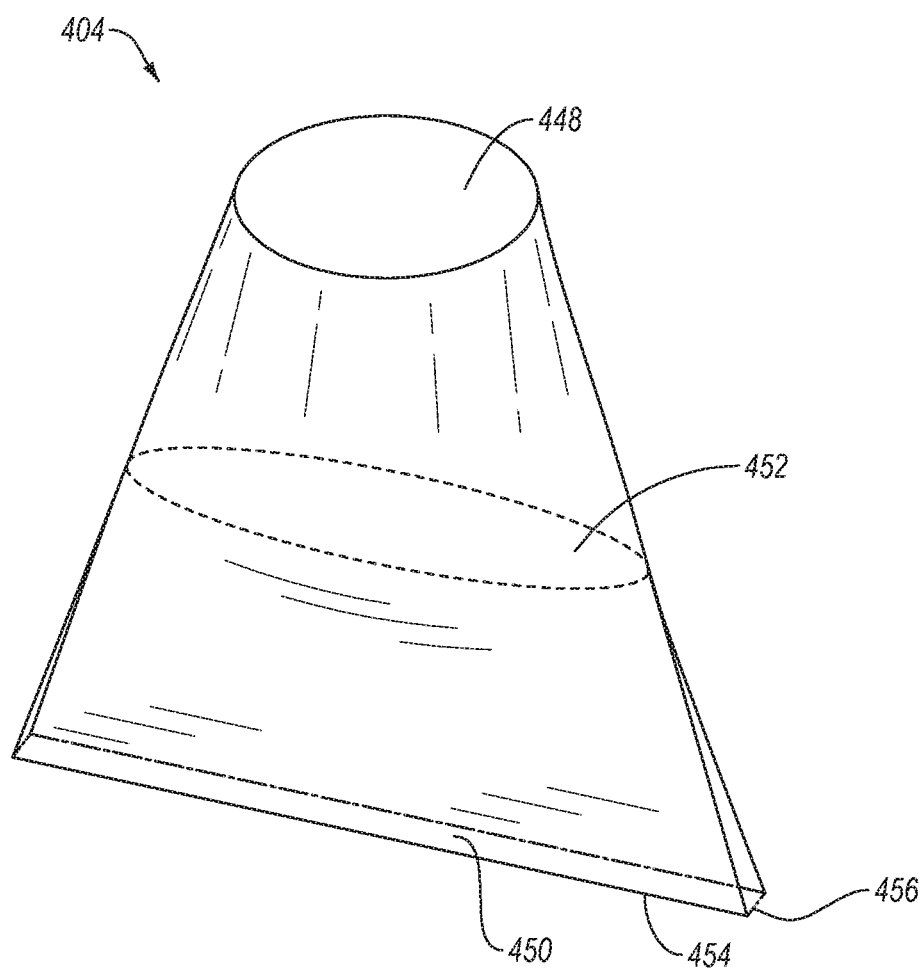
FIGS. 4A and 4B are isometric and top elevational views, respectively, of a mandrel, according to an embodiment.
Figure 4B:
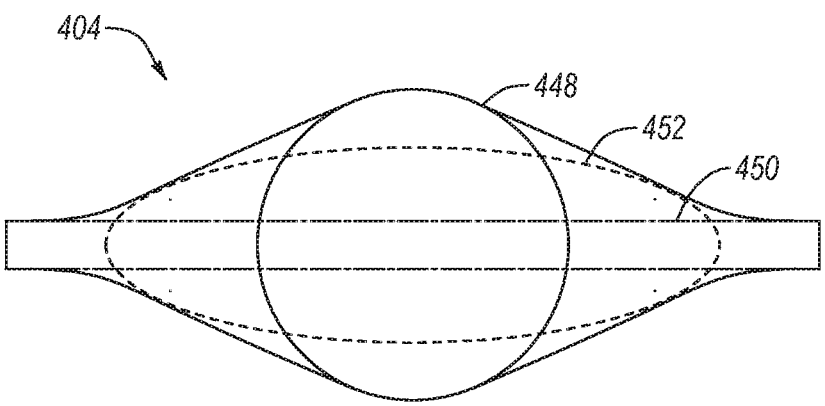

The cross-sectional shape of the mandrel may change along the longitudinal axis of the mandrel. FIGS. 4A and 4B are isometric and top plan views, respectively, of a mandrel 404, according to an embodiment. Except as otherwise described herein, the mandrel 404 shown in FIGS. 4A-4B and its materials, components, or elements may be similar to or the same as the mandrel 104 (FIGS. 1-3B) and its respective materials, components, or elements. The mandrel 404 illustrated in FIGS. 4A-4B may be used in any of the fiber gun embodiments disclosed herein. For ease of discussion, FIGS. 4A-4B illustrate a cross-sectional shape at and/or near an uppermost portion 448 of the mandrel 404, a cross-sectional shape at and/or near a lowermost portion 450 of the mandrel 404, and a cross-sectional shape of an intermediate portion 452 of the mandrel 404 (e.g., a portion of the mandrel 404 between the uppermost portion 448 and the lowermost portion 450). Portions of the lowermost portion 450 that are obscured and the entire intermediate portion 452 are shown using phantom lines.

The cross-sectional area at and/or near the uppermost portion 448 of the mandrel 404 may be greater than the cross-sectional area of the intermediate portion 452. Similarly, the cross-sectional area of the intermediate portion 452 may be greater than the cross-sectional area at and/or near the lowermost portion 450. However, the cross-sectional perimeter at and/or near the uppermost portion 448, the intermediate portion 452, and the lowermost portion 450 may remain substantially constant.

As previously discussed, the cross-sectional shapes at and/or near the uppermost portion 448, the intermediate portion 452, and the lowermost portion 450 may be different. In an embodiment, the mandrel 404 may continuously transform its shape to reduce its cross-sectional area to form a relatively small cross-sectional area at and/or near the lowermost portion 450 thereof. For example, in illustrated embodiment, the uppermost portion 448 may exhibit a generally circular cross-sectional shape, the intermediate portion 452 may exhibit a generally elliptical cross-sectional shape, and the lowermost portion 450 may exhibit a generally rectangular cross-sectional shape.

As previously discussed, the generally circular cross-sectional shape at and/or near the uppermost portion 448 may facilitate wrapping the one or more fibers (not shown) around the mandrel 404. During operation, the one or more fibers may move along the mandrel 404 towards the lowermost portion 450. One or more portions of the one or more fibers may become straighter as the one or more fibers move along the mandrel 404. For example, the portions of the one or more fibers that contact an elongated side 454 of the mandrel 404 at and/or near the lowermost portion 450 of the mandrel 404 may be substantially straight. The length of the elongated side 454 may determine the lengths of the one or more fiber segments. In an embodiment, the portions of the one or more fibers that contact a narrower side 456 of the mandrel 404 at and/or near the lowermost portion 450 of the mandrel 404 may be cut using one or more cutting elements to form one or more fiber segments that are substantially straight along substantially an entire length thereof.

Figure 4C:
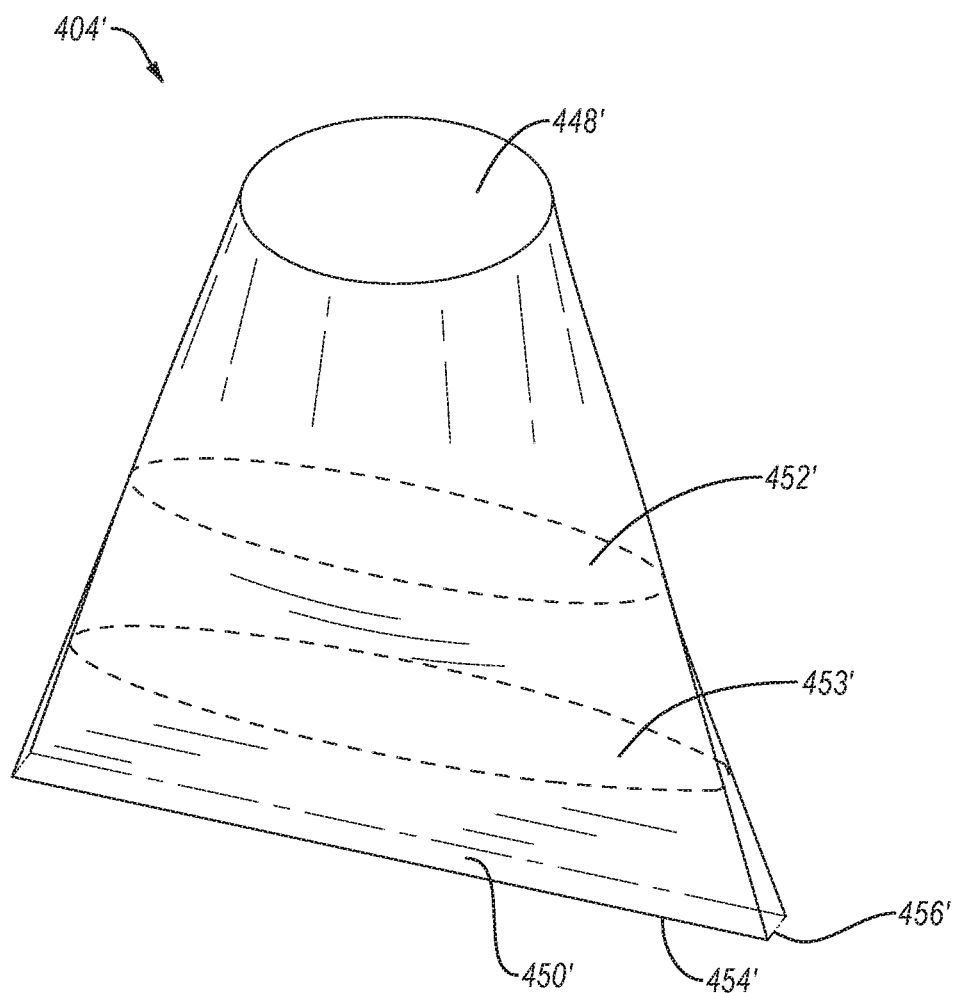
FIG. 4C is an isometric view of a mandrel, according to an embodiment.

FIG. 4C is an isometric view of a mandrel, according to an embodiment. Except as otherwise described herein, the mandrel 404' shown in FIG. 4C and its materials, components, or elements may be similar to or the same as the mandrel 404 (FIGS. 4A-4B) and its respective materials, components, or elements. The mandrel 404' illustrated in FIG. 4C may be used in any of the fiber gun embodiments disclosed herein. For ease of discussion, FIG. 4C illustrates a cross-sectional shape at and/or near an uppermost portion 448' of the mandrel 404', a cross-sectional shape at and/or near a lowermost portion 450' of the mandrel 404', a cross-sectional shape of an intermediate portion 452' of the mandrel 404 (e.g., a portion of the mandrel 404' between the uppermost portion 448' and the lowermost portion 450'), and a portion 453' of the mandrel 404' near the lowermost portion 450' or near the at least one cutting surface. Portions of the lowermost portion 450' that are obscured, the entire the intermediate portion 452', and the entire portion 453' of the mandrel 404' near the lowermost portion 450' or near the at least one cutting surface are shown using phantom lines.

The cross-sectional perimeter at and/or near the uppermost portion 448', the intermediate portion 452', and the portion 453' of the mandrel 404' near the lowermost portion 450' or near the at least one cutting surface remains constant. The cross-sectional perimeter of the mandrel 404' increases by at most 5% from the portion 453' of the mandrel 404' near the lowermost portion or near the at least one cutting surface to the lowermost portion 450' or the at least one cutting surface.

It will be appreciated that the mandrel 404 may vary in shape, geometry, or dimensions to provide various fiber lengths. For example, the uppermost portion 448 may exhibit a generally rectangular cross-sectional shape, the intermediate portion 452 may exhibit a generally triangular cross-sectional shape, and the lowermost portion 450 may exhibit a generally elliptical cross-sectional shape.

Figure 5A:
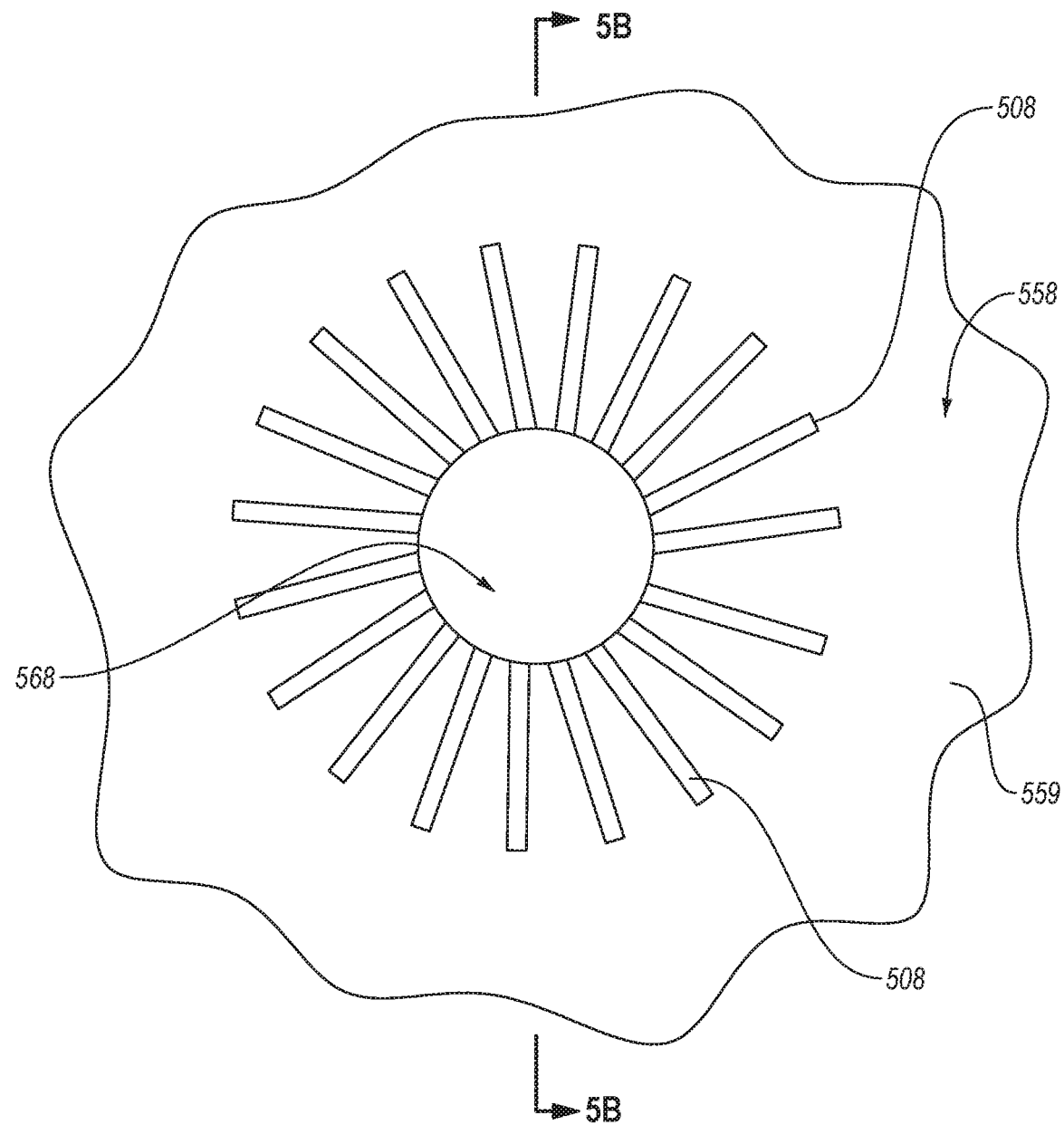
FIG. 5A is a top plan view of a composite component that may have one or more fiber segments positioned thereon by any of the apparatuses disclosed herein, according to an embodiment.
Figure 5B:
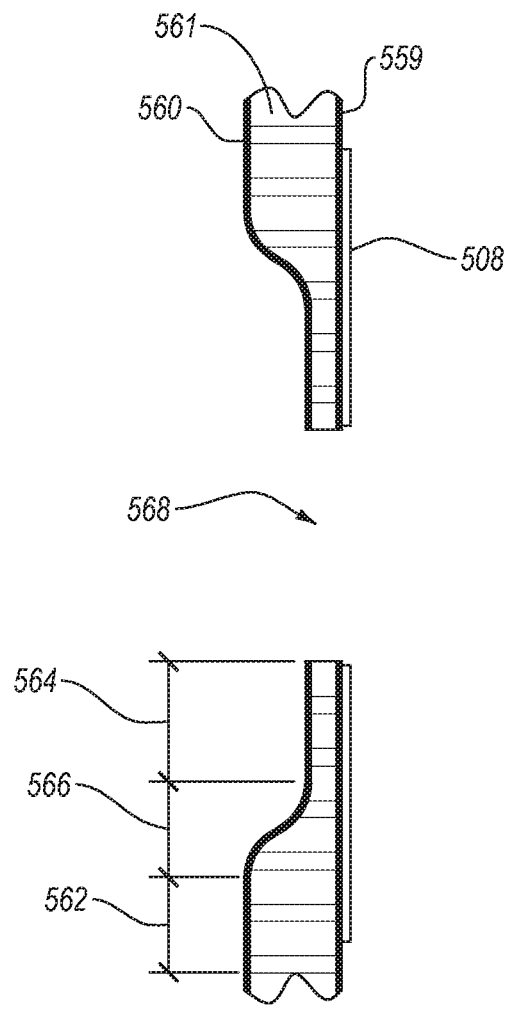
FIG. 5B is a cross-sectional view of a portion of the composite component taken along line 5B-5B shown in FIG. 5A.

The apparatuses disclosed herein may be used to position one or more fiber segments on different composite components. FIG. 5A is top plan view of a composite component 558 that may have one or more fiber segments 508 positioned thereon by any of the apparatuses disclosed herein, according to an embodiment. FIG. 5B is a cross-sectional view of a portion of the composite component 558 taken along line 5B-5B shown in FIG. 5A. In an embodiment, the composite component 558 may be a composite sandwich structure including a top layer 559, a bottom layer 560 spaced from the top layer 559, and a core region 561 filling the gap between the top layer 559 and the bottom layer 560. Examples of composite sandwich structures that may be used are disclosed in U.S. Patent Application No. 62/007,614, entitled "Composite Sandwich with High Bending Stiffness and Light Weight," filed on Jun. 4, 2014 and U.S. Patent Application No. 62/007,670, entitled "Composite Sandwich with High Energy Absorption and Free of Surface Defects," filed on Jun. 4, 2014. In an embodiment, the composite component 558 may be formed from a single material (e.g., the composite is formed by reinforcing the single material with the one or more fiber segments 508), or another other suitable composite component.

The top layer 559 may include one or more fiber segments 508 coupled thereto (e.g., using a cured polymer resin or an adhesive) to reinforce the composite component 558. For example, as shown in FIG. 5B, the composite component 558 may include one or more transition regions that are reinforced using the one or more fiber segments 508. In the illustrated embodiment, the transition region may be a region of the composite component 558 exhibiting different thicknesses. For example, the transition region of the composite component 558 may include a thicker section 562, a thinner section 564, and a transition section 566 extending from the thicker section 562 to the thinner section 564. The composite component 558 may also define a hole 568 that may be reinforced using the one or more fiber segments 508. For example, the hole 568 may be defined by the thinner section 564 of the composite component 558.

In an embodiment, the composite component 558 may be disposed in any of the apparatuses disclosed herein such that the top layer 559 of the composite component is below the fiber gun (e.g., the composite component 558 is the supporting member 110 of FIG. 1). The apparatus may include a robot that controllably moves the fiber gun relative to the composite component 558 such that the fiber gun is above a portion of the composite component 558 that is to receive a fiber segment 508. The fiber gun may cut one or more fibers to form the fiber segment 508 having a selected length and controllably positioned (e.g., drop) the fiber segment 508 onto the selected portion of the composite component 558. At least some of the acts of moving the fiber gun, cutting the one or more fibers, and positioning the fiber segment 508 on the composite component 558 may be performed substantially simultaneously or at least one of the acts may be performed individually. The process may be repeated until the composite component 558 is sufficiently reinforced. For example, the process may be repeated until the one or more fiber segments 508 are arranged in a radial pattern, as shown in FIGS. 5A-5B, or in any other suitable pattern.

In another embodiment, the apparatus may cut the one or more fibers into one or more fiber segments 508 according to the method described above. The fiber gun may then position the one or more fiber segments 508 on a support structure. In this embodiment, the support structure is not the composite component 558. The one or more fiber segments 508 may be removed from the support structure and disposed on the top layer 559 of the composite component 558. The one or more fiber segments 508 may be arranged in the pattern shown in FIGS. 5A-5B or in any other suitable pattern.

Figure 6A:
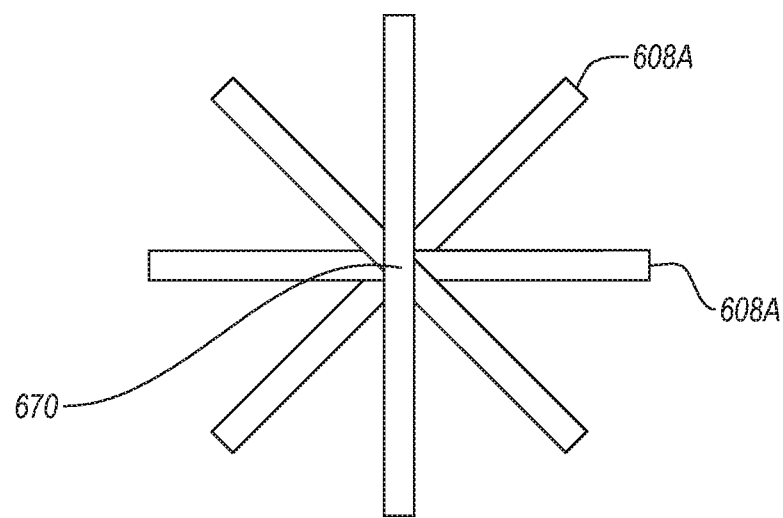
FIGS. 6A and 6B are top plan views of an arrangement of a plurality of one or more fiber segments that may be used to reinforce a hole of a composite component, according to different embodiments.
Figure 6B:
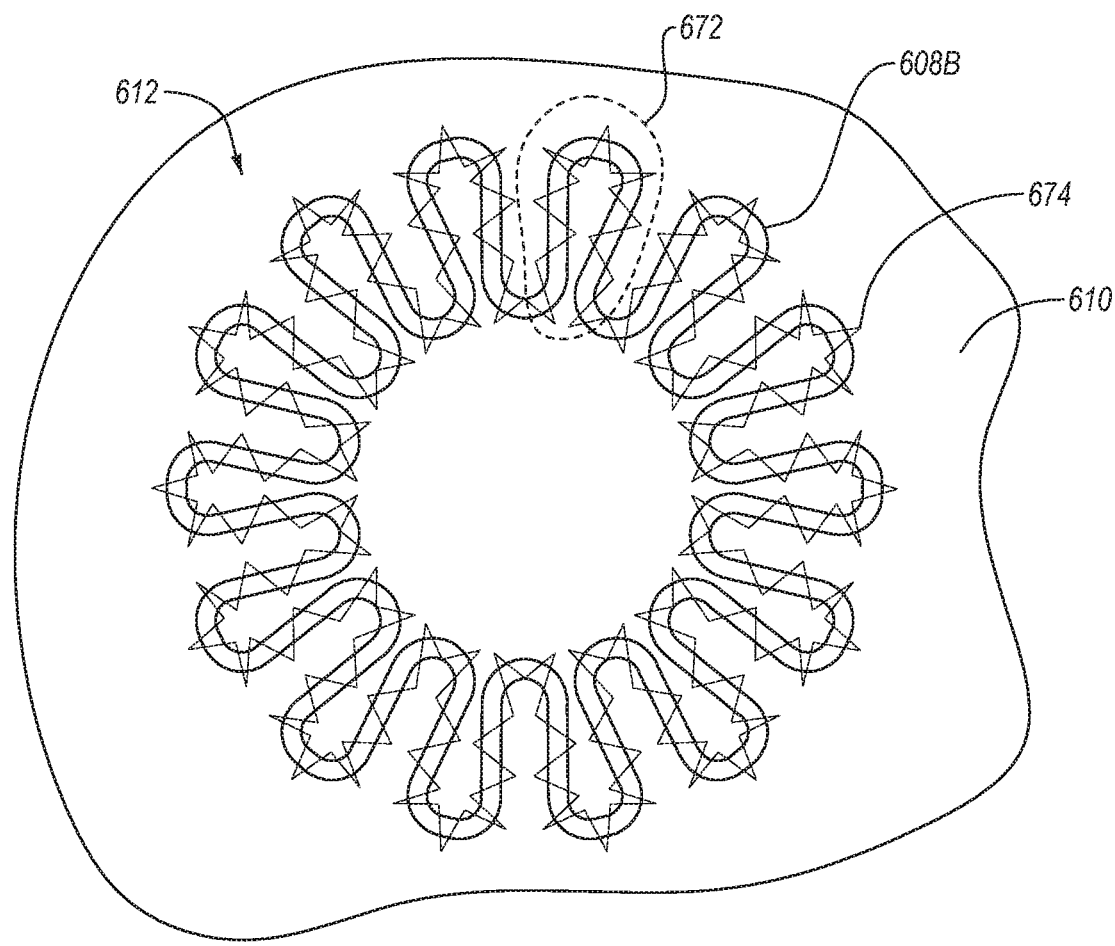

In another embodiment, a composite component may define a hole (e.g., hole 568 of FIGS. 5A-5B) that may need to be reinforced. FIGS. 6A and 6B are top plan views of an arrangement of a plurality of one or more fiber segments 608A that may be used to reinforce a hole of a composite component, according to different embodiments. Referring to FIG. 6A, the plurality of one or more fiber segments 608A may be arranged to form a radial pattern. Each of the plurality of one or more fiber segments 608A may be arranged to have an overlapping area 670 among all the plurality of one or more fiber segments 608A, while each fiber segment 608A may be oriented at a different angle relative to another fiber segment 608A. Alternatively, the plurality of one or more fiber segments 608A may be arranged in a linear or grid-like pattern. There may be some benefits for forming the plurality of one or more fiber segments 608A in a radial pattern instead of a linear pattern since the radial pattern may enable the plurality of one or more fiber segments 608A to reinforce the composite in more load directions.

The one or more fiber segments 608A may be arranged in substantially the same manner as disclosed in FIGS. 5A-5B. For example, the composite component defining a hole may be disposed in any of the apparatuses disclosed herein such that the hole is below the fiber gun. The fiber gun may cut one or more fibers to form a fiber segment 608A having a selected length (e.g., a length greater than a width of the hole) and controllably positioned the fiber segment 608A onto the hole such that the fiber segment extends over the hole.

Another way of reinforcing a composite component includes forming the plurality of one or more fiber segments 608B into a selected shape. FIG. 6B is a top view of a supporting member 610 that includes a plurality of one or more fiber segments 608B formed into a pattern 672 that at least partially forms a selected shape, according to an embodiment. In an embodiment, any of the apparatuses disclosed herein may be used to position the plurality of one or more fiber segments 608B on the supporting member 610 such that the plurality of one or more fiber segments 608B form the pattern 672. The pattern 672 may be a 2-dimensional pattern. The pattern 672 may be any suitable pattern that may reinforce a composite component. In an embodiment, the pattern 672 forms a generally u-shape that partially forms the selected shape (e.g., the selected shape is formed from a plurality of patterns 672). In an embodiment, the pattern 672 may be any suitable pattern that partially forms the selected shape. In an embodiment, the pattern 672 may form an entirety of the selected shape.

The plurality of one or more fiber segments 608B may be coupled together such that the plurality of one or more fiber segments 608B may maintain the pattern 672. For example, the plurality of one or more fiber segments 608B may be stitched together using a plurality of stitches 674. For example, the plurality of one or more fiber segments 608B may be coupled together using a polymer resin or an adhesive.

In an embodiment, the supporting member 610 is the composite component. In such an embodiment, the plurality of one or more fiber segments 608B may be attached to a surface of the composite component when the plurality of one or more fiber segments 608B are coupled together. In an embodiment, the supporting member 610 is distinct from the composite component. In such an embodiment, the plurality of one or more fiber segments 608B may be removed from the supporting member 610 after the plurality of one or more fiber segments 608B are coupled together and disposed on the composite component. The plurality of one or more fiber segments 608B may then be attached to a surface of the composite component.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present methods and systems, which, as a matter of language, might be said to fall therebetween.

What is claimed is:

1. A fiber gun, comprising:
   a mandrel having a longitudinal axis and coupleable to a source including one or more fibers, the mandrel including:
   an uppermost portion;
   a first portion at and/or near the uppermost portion;
   a lowermost portion generally opposite the uppermost portion;
   a second portion at and/or near the lowermost portion;
   a length extending between the uppermost portion and the lowermost portion;
   a cross-sectional area that varies along at least a portion of the length of the mandrel; and
   a cross-sectional perimeter of the mandrel remains constant from the first portion of the mandrel to a portion of the mandrel near the lowermost portion or near at least one cutting surface of the mandrel, and wherein the cross-sectional perimeter increases by at most 5% from the portion of the mandrel near the lowermost portion or near the at least one cutting surface to the lowermost portion or the at least one cutting surface;
   a transport mechanism configured to move the one or more fibers from the first portion of the mandrel the second portion of the mandrel; and
   at least one cutter including one or more cutting elements, each of the one or more cutting elements disposed at least proximate to the at least one cutting surface of the mandrel and configured to cut the one or more fibers, the at least one cutting surface being at least one of at or near the lowermost portion of the mandrel.

2. The fiber gun of claim 1, wherein the cross-sectional area of the mandrel generally decreases from the uppermost portion to the lowermost portion.

3. The fiber gun of claim 1, wherein the cross-sectional area of the mandrel varies along substantially all of the length of the mandrel.

4. The fiber gun of claim 1, wherein the cross-sectional perimeter of the mandrel increases by at most 3% from the portion of the mandrel near the lowermost portion or near the at least one cutting surface to the lowermost portion of the at least one cutting surface.

5. The fiber gun of claim 1, wherein a cross-sectional shape of the mandrel at least one of at or near the uppermost portion is generally circular.

6. The fiber gun of claim 1, wherein a cross-sectional shape of the mandrel at and/or near the lowermost portion is more elongated than a cross-sectional shape of the mandrel at least one of at or near the uppermost portion.

7. The fiber gun of claim 1, wherein a cross-sectional shape of the mandrel at and/or near the lowermost portion includes at least one elongated side and at least one narrow side, wherein the at least one elongated side is substantially straight.

8. The fiber gun of claim 1, wherein the transport mechanism includes at least one belt disposed at least proximate to at least one surface of the mandrel.

9. The fiber gun of claim 8, wherein the at least one belt includes a first belt and a second belt, and wherein the at least one surface of the mandrel includes a first surface and a second surface opposite the first surface, wherein the first belt is disposed at least proximate to the first surface and the second belt is disposed at least proximate to the second surface.

10. The fiber gun of claim 1, wherein the one or more cutting elements includes at least one grinding wheel that is rotatable relative to the mandrel.

11. The fiber gun of claim 1, wherein the one or more cutting elements includes at least one ultrasonic scissor.

* * * * *